No. 882,226. PATENTED MAR. 17, 1908.
A. M. ZIMMERMAN.
MEANS FOR FORCING COOLING LIQUIDS TO ENGINES.
APPLICATION FILED AUG. 22, 1906.
3 SHEETS—SHEET 1.
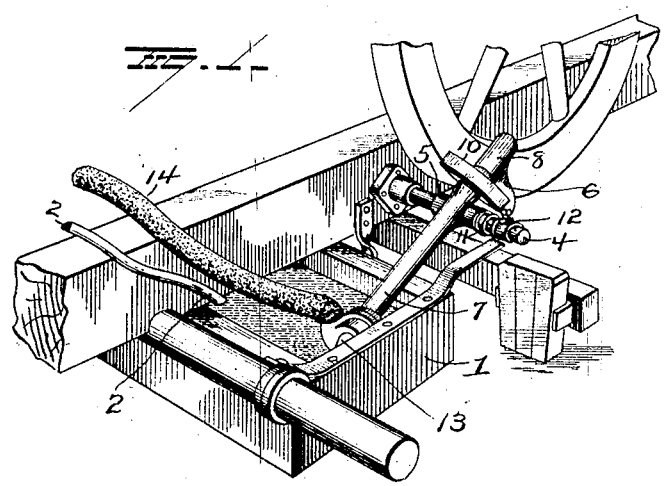
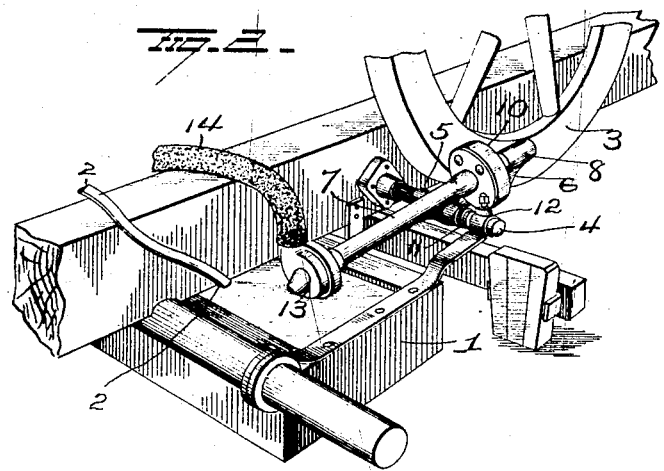
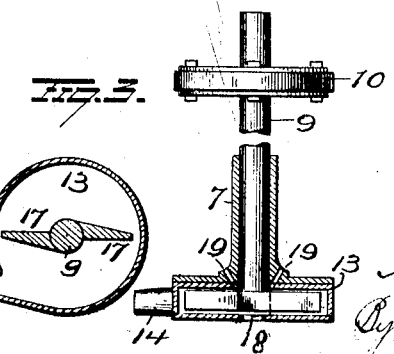
WITNESSES
E. D. Nottingham
G. F. Downing
INVENTOR
A. M. Zimmerman
By H. A. Seymour
Attorney

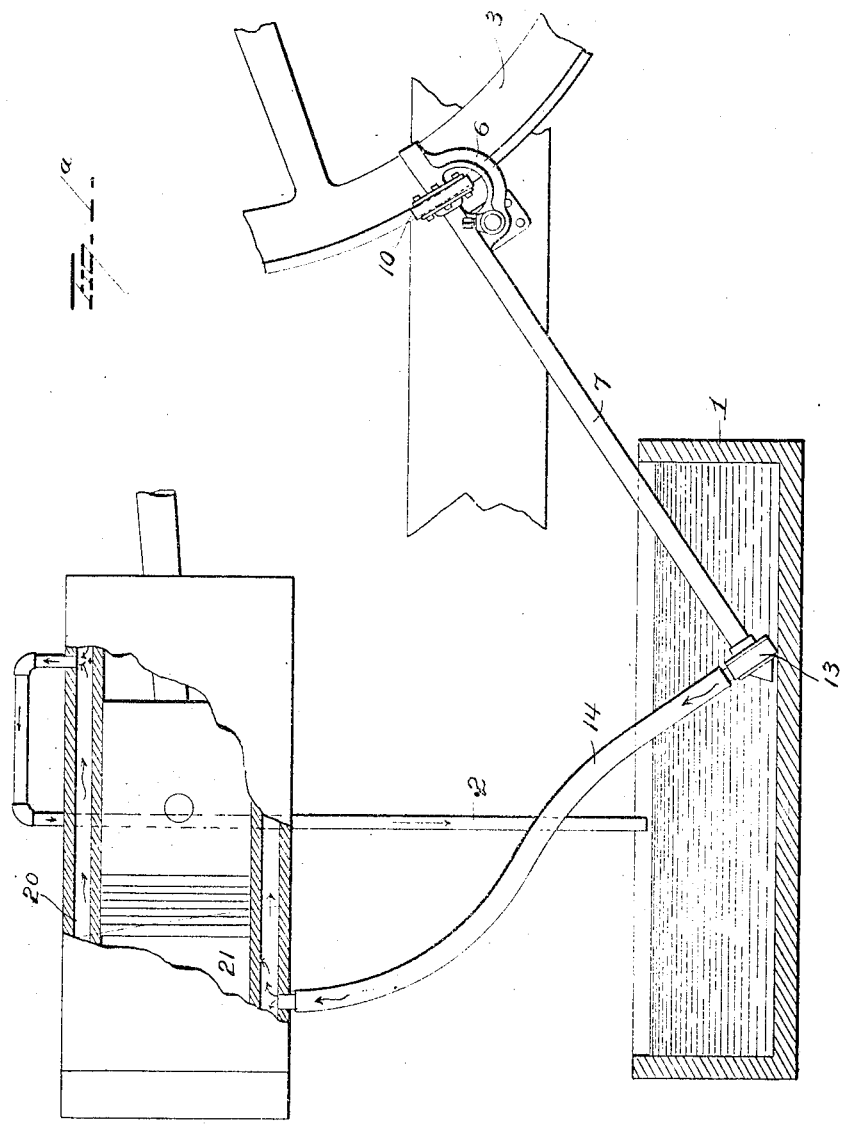

No. 882,226. PATENTED MAR. 17, 1908.
A. M. ZIMMERMAN.
MEANS FOR FORCING COOLING LIQUIDS TO ENGINES.
APPLICATION FILED AUG. 22, 1906.
3 SHEETS—SHEET 3.
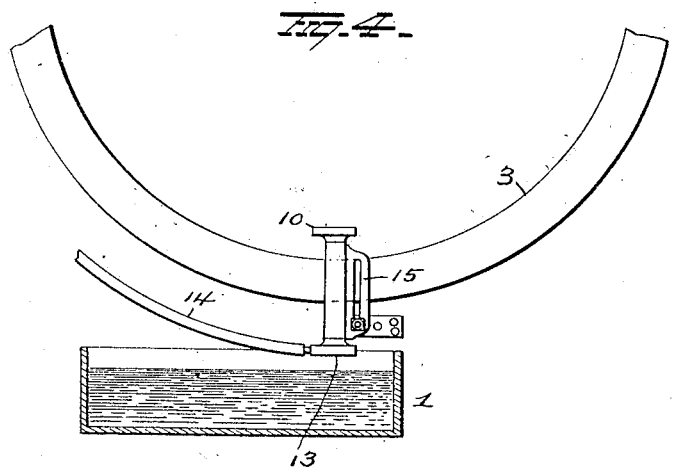
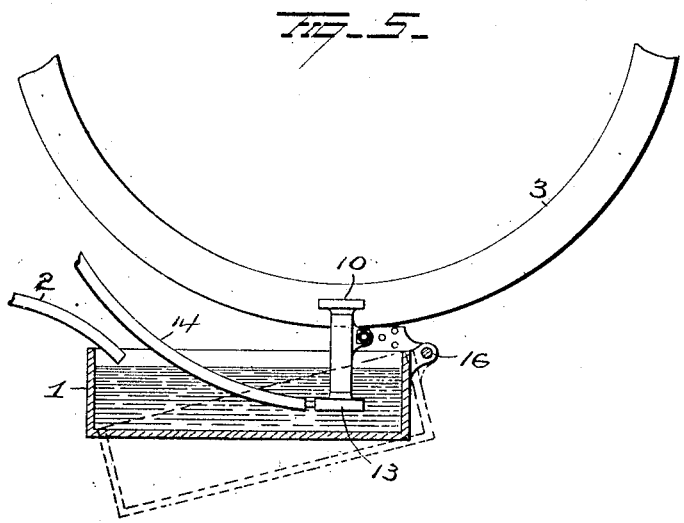
WITNESSES
INVENTOR
A. M. Zimmerman
By H. G. Seymour
Attorney

UNITED STATES PATENT OFFICE.

ABRAHAM M. ZIMMERMAN, OF NEW HOLLAND, PENNSYLVANIA, ASSIGNOR TO NEW HOLLAND MACHINE CO., OF NEW HOLLAND, PENNSYLVANIA.

MEANS FOR FORCING COOLING LIQUIDS TO ENGINES.

No. 882,226.  Specification of Letters Patent.  Patented March 17, 1908.

Application filed August 22, 1906. Serial No. 331,639.

*To all whom it may concern:*

Be it known that I, ABRAHAM M. ZIMMERMAN, a resident of New Holland, in the county of Lancaster and State of Pennsylvania, have invented certain new and useful Improvements in Means for Forcing Cooling Liquid to Engines; and I do hereby declare the following to be a full, clear, and exact description of the invention, such as will enable others skilled in the art to which it appertains to make and use the same.

My invention relates to means for circulating fluids through the cooling means of engines,—the object of the invention being to provide a pump for causing a circulation of fluid through the jacket of a gas engine and to so mount said pump and a tank from which it receives fluid, that one can move relatively to the other, whereby when the water in said tank has become frozen, the pump can be made to force water (which may be poured upon the ice in the tank) through the water jacket of the engine, the return of said water to the tank acting to melt the ice therein, and permit the descent of the pump.

A further object is to provide means whereby the pump will be operated by the fly wheel of the engine.

With these and other objects in view, the invention consists in certain novel features of construction and combinations and arrangements of parts as will be more fully hereinafter described and pointed out in the claims.

In the accompanying drawings, Figure 1 is a perspective view illustrating my improvements and Fig. 1ª is a view showing the application of my improvement to an engine. Fig. 2 is a similar view showing the pump elevated above a frozen body of water in the tank. Fig. 3 is a sectional view illustrating the pump and casing construction, and Figs. 4 and 5 are views of modifications.

1 represents a water tank, to which warm water from the cooling jacket 20 of an engine cylinder 21 is returned by pipe 2, and 3 represents the engine fly wheel. A journal 4 projects out from the side of the engine frame adjacent to the periphery of the fly wheel, to receive a sleeve 5 on a bracket 6, and pivotally support the latter. This bracket 6 is provided with aligned tubes 7 and 8, in which a shaft 9 is mounted, and a friction wheel 10 is carried on said shaft, between tubes 7 and 8, and engages the rim of the fly wheel 3 and so as to be driven thereby. A coiled spring 11 is located on journal 4 between the sleeve 5 and a nut 12 on the outer end of the journal, to maintain the friction wheel 10 in engagement with the fly wheel.

The free end of tube 7 supports a cylindrical pump casing 13, in which a rotary or centrifugal pump propeller 17 is located, and secured to shaft 9, to force the water through a pipe 14 connecting the periphery of the pump casing with the engine.

The pump casing receives the water through a central inlet opening 18 in its bottom and by the centrifugal action of the propeller, discharges the water through pipe 14 to the cooling jacket of the engine. The rapid revolution of propeller 17 has a tendency to create a vacuum at the upper central portion of casing 13, to compensate for which, water inlets 19 are provided in the casing wall around the tube 7, to admit water and this water is forced out with the main body of water admitted through opening 18. Without these inlets 19, the propeller would suck air through tube 7 around shaft 9 and the pump would fail to work properly if at all.

During the normal operation of the apparatus the pump is submerged in the water and forces water through pipe 14 to the cooling jacket of the engine and the return of the water from the engine to the tank 1 is effected by the pipe 2. Should the water be frozen in the tank, the pump can be rested on top of the ice, as shown in Fig. 2, and a small quantity of water supplied to the tank, the water thus poured upon the ice in the tank will be forced by the pump to the engine and returned in a heated condition to the tank to melt the ice, and as the ice melts the pump will move downwardly.

The tank is located lower than the engine cylinder, so as to drain the water back into the tank as soon as the engine stops, avoiding all possibility of freezing the water in the cooling jacket of the engine cylinder, and injuring the same. By having the pump located directly in the water, check valves are not required. Therefore, the water will drain from the cylinder jacket to the tank when engine stops and be forced to the jacket as soon as the engine is started.

In the modification shown in Fig. 4, the pump is provided with a slotted bracket 15 for the accommodation of a suitable bolt. With this construction, the pump can be raised out of the water in the tank when not in operation, as shown in Fig. 4. Should the water in the tank freeze when the engine is not running, it is simply necessary (when the engine is to be started) to lower the pump and add sufficient water to the tank to start circulation.

With the construction shown in Fig. 5, the tank is hinged at 16, so that the tank can be lowered when the engine is not running, as shown by dotted lines. When the engine is started, the operator will raise the tank and if the latter contains ice, he will pour sufficient water upon the ice to permit the pump to start circulation and the hot water returning from the water jacket of the engine through the pipe 2, will melt the ice in the tank.

Other changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention what I claim as new and desire to secure by Letters-Patent is:—

1. In a device of the character described, the combination of a tank and a liquid forcing device having mountings independent of each other, and one of said devices movable relatively to the other.

2. In a device of the character described, the combination with a tank and an engine of a pump to receive water from the tank driven by the fly wheel of the engine and a movable mounting or support for said pump.

3. In a device of the character described, the combination with a tank and an engine, of a movable bracket, a shaft supported thereby, a friction wheel on the shaft to engage a wheel of an engine, a pump in the tank operated by the shaft, and a spring holding the friction wheel in engagement with the fly wheel.

4. In a device of the character described, the combination with an engine, and a tank located below the cooling jacket of the cylinder of the engine and into which said cooling jacket drains, of a pivotally supported pump in the tank and a pipe to convey water from the pump to the cooling jacket of the engine cylinder.

5. The combination of a tank and a pump, one movable relatively to the other, and engine means for connecting said pump with the water jacket of the engine cylinder and means for connecting said water jacket with the tank.

6. The combination with a tank and an engine, of a pump movable up and down and arranged to receive fluid from said tank, means for driving said pump, and means for connecting said pump with the cooling devices of the engine.

7. The combination with an engine having cooling devices, and a tank for supplying fluid for said cooling devices, of a pivotally supported pump constructed and adapted to take fluid from said tank and force the same to said cooling devices, and means for driving said pump from a wheel of the engine.

8. The combination with an engine having cooling devices and a tank for supplying fluid to said cooling devices, of a valveless, centrifugal pump to force water from said tank to the cooling devices and permit the fluid to drain back to the tank when the engine is at rest, and means for operating the pump.

In testimony whereof, I have signed this specification in the presence of two subscribing witnesses.

ABRAHAM M. ZIMMERMAN.

Witnesses:
 S. F. RETTEN,
 J. F. BRUBAKER.